US007983064B2

(12) United States Patent
Zhang et al.

(10) Patent No.: US 7,983,064 B2

(45) Date of Patent: Jul. 19, 2011

(54) POWER ADAPTER

(75) Inventors: Yong Zhang, Taipei Hsien (TW); Yong-Jun Liao, Taipei Hsien (TW); Guo-Qiang Tang, Taipei Hsien (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 450 days.

(21) Appl. No.: 12/206,190

(22) Filed: Sep. 8, 2008

(65) Prior Publication Data

US 2010/0061130 A1 Mar. 11, 2010

(51) Int. Cl.

*H02M 7/86* (2006.01)
*H02M 7/88* (2006.01)
*H02M 7/90* (2006.01)

(52) U.S. Cl. .......................... 363/146; 439/171; 439/173

(58) Field of Classification Search .......... 363/144–146; 439/171–175, 620, 692, 879, 891

See application file for complete search history.

(56) References Cited

U.S. PATENT DOCUMENTS

| | | | | |
|---|---|---|---|---|
| 6,297,982 | B1 | 10/2001 | Wu | |
| 6,471,365 | B2 * | 10/2002 | Wang et al. | 362/84 |
| 6,644,984 | B2 * | 11/2003 | Vista et al. | 439/76.1 |

* cited by examiner

*Primary Examiner* — Gary L Laxton
*Assistant Examiner* — Nusrat J Quddus
(74) *Attorney, Agent, or Firm* — WPAT, P.C.; Anthony King

(57) ABSTRACT

A power adapter includes an insulation casing. A plug module has at least one plug pin which defines a plug end protruding out of the insulation casing and an inserting end opposite to the plug end received in the insulation casing. The insulation casing receives a printed circuit board, at least one connecting member and conductive member therein. The conductive member is fixed on the printed circuit board and defines a receiving space. The connecting member has a contact portion received in the receiving space of the conductive member for electrical connection therebetween and a retaining portion connecting with the inserting end of the plug module. The assembly structure of the power adapter is simplification.

7 Claims, 5 Drawing Sheets

POWER ADAPTER

BACKGROUND OF THE INVENTION

1. Field of the Invention

The present invention generally relates to a power adapter, and more particularly to a power adapter capable of stably connecting a plug module with a printed circuit board thereof.

2. The Related Art

A conventional power adapter includes an insulation casing, plugs, a printed circuit board (PCB) and electric wires. The insulation casing includes a first insulation casing and a second insulation casing coupled to the first insulation casing to form a closed space to receive the PCB and the electric wires therein. The plugs are exposed out of the first insulation casing. The electric wires are used to connect the plugs with the PCB, and thereby the PCB can receive external power via the plugs and the electric wires to perform functions of the power adapter.

Nowadays, that various electronic devices including the power adapters are miniaturized becomes a tendency. However, because the conventional power adapter employs the electric wires to connect the plugs with the PCB, the electric wires must be long enough to let both ends of the electric wires be welded on the plugs and the PCB. In this condition, the electric wires take up a lot of space of the power adapter. It results in the limitation of miniaturizing the power adapter.

In order to overcome the disadvantage of the conventional power adapter, a power adapter is disclosed in U.S. Pat. No. 6,297,982 which includes a first housing disposing plug pins thereon, a second housing disposing conducting pieces thereon, a PCB positioned between the first housing and the second housing, and a connector having first connecting elements and second connecting elements both mounted on the PCB. The PCB defines two holes for enabling the conducting pieces disposed on the second housing to protrude therethrough to connect with the second connecting elements of the connector. The plug pins disposed on the first housing are connected with the first connecting elements of the connector. Therefore, the power adapter can transmit external power to electronic devices through the conducting pieces, the connector and the plug pins.

However, in the assembly of above mentioned power adapter, it is difficult to aim the conducting pieces disposed on the second housing at the holes defined on the PCB to connect with the second connecting elements of the connector. As a result, the assembly of the power adapter becomes complicated and the connecting reliability between the plug pins and the PCB will probably be affected.

SUMMARY OF THE INVENTION

An object of the present invention is to provide a power adapter capable of stably connecting a plug module with a printed circuit board thereof. The power adapter includes an insulation casing. A plug module has at least one plug pin that defines a plug end protruding out of the insulation casing, and an inserting end opposite to the plug end received in the insulation casing. The insulation casing receives a printed circuit board, at least one connecting member and conductive member therein. The conductive member has at least one fixed portion located on the printed circuit board and defines a receiving space. The connecting member has a contact portion received in the receiving space of the conductive member for electrical connection therebetween and a retaining portion connecting with the inserting end of the plug module.

As described above, by inserting the contact portion of the connecting member into the receiving space of the conductive member, and by connecting the inserting end of the plug module to the retaining portion of the connecting member, the plug module can stably connect to the printed circuit board. Thus, it simplifies the assembly structure of the power adapter.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
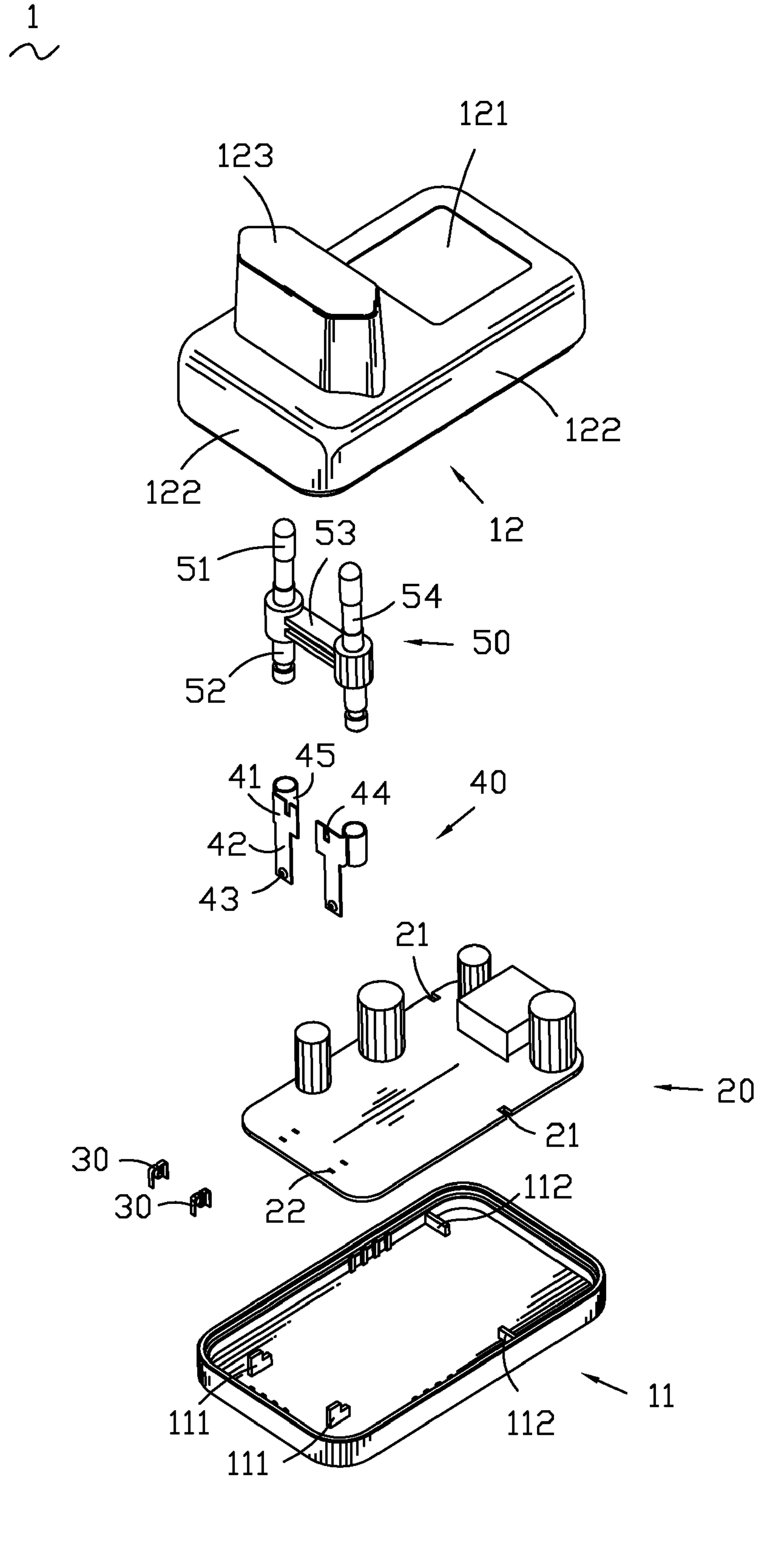
FIG. 1 is an exploded view of a power adapter of a first embodiment of the present invention.

Referring to FIG. 1 to FIG. 5 showing a first preferred embodiment of a power adapter 1 in accordance with the present invention, the power adapter 1 includes a first insulation casing 11 and a second insulation casing 12 coupled to the first insulation casing 11 to form a closed space to receive a printed circuit board (PCB) 20, a pair of conductive members 30, a pair of connecting members 40 and a plug module 50 therein.

The first insulation casing 11 defines a pair of first holders 111 in substantial L-shape on a bottom thereof. The bottom of the first insulation casing 11 defines a pair of first ribs 112 respectively connecting with two opposite sides of the first insulation casing 11.

Figure 2:
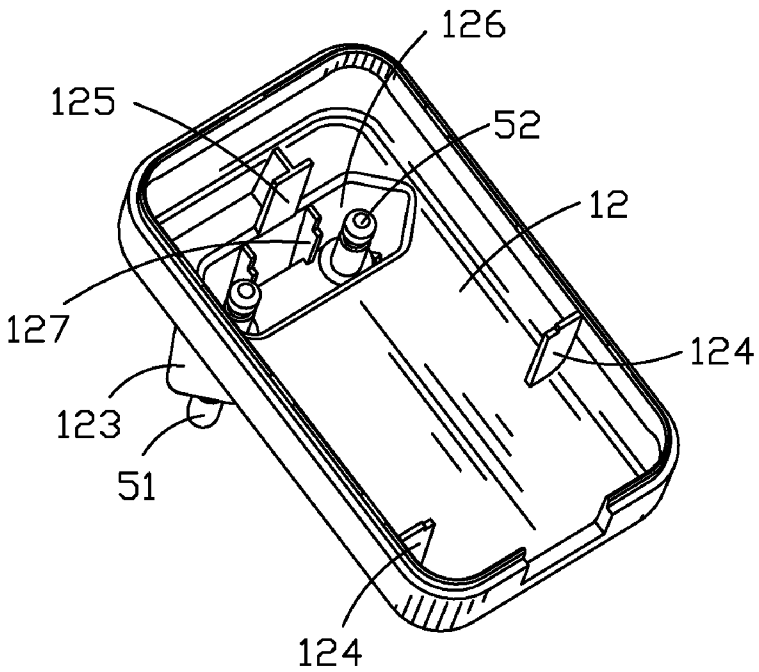
FIG. 2 is an assembly view of a second insulation casing and a plug module of the power adapter.

Referring to FIG. 1 and FIG. 2, the second insulation casing 12 has a top wall 121, sidewalls 122 extending downward from corresponding sides of the top wall 121, and a convex portion 123 having a notch 126 therein protruding upwardly from an outer surface of the top wall 121. Corresponding to the first ribs 112 of the first insulation casing 11, the second insulation casing 12 defines a pair of second ribs 124 on an inner surface of the top wall 121. The second ribs 124 connect with the corresponding opposite sidewalls 122 respectively. A side of the notch 126 protrudes to define a pair of fixed boards 127 received therein. The inner surface of the top wall 121 defines a substantially T-shaped second holder 125 adjacent to the fixed boards 127.

Figure 3:
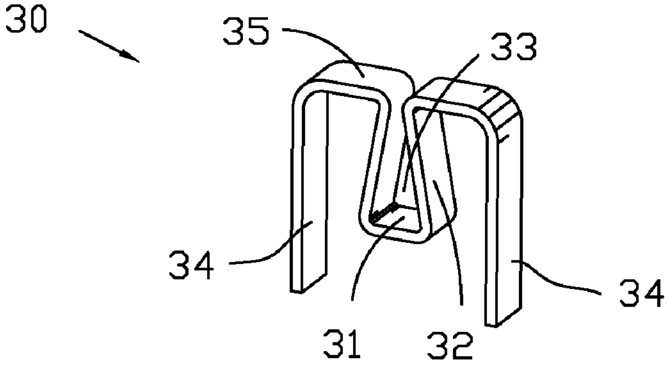
FIG. 3 is a perspective view of a conductive member of the power adapter.

Please refer to FIG. 3. Each of the conductive members 30 is substantially formed in m-shape. The conductive member 30 has a base portion 35 disposed horizontally. Two ends of the base portion 35 are bent downward to form fixed portions 34. A middle portion of the base portion 35 sinks downward to form a first limitation portion 31 disposed horizontally and two second limitation portions 32 at opposite sides of the first limitation portion 31 and connecting the first limitation portion 31 to base portion 35. The first limitation portion 31 and the second limitation portions 32 define a receiving space 33 therebetween. An opening portion of the receiving space 33 is narrower than a bottom portion thereof.

With reference to FIG. 1 again, the PCB 20 defines two channels 21 at two opposite edges thereof and two pairs of fixing holes 22 at one end thereof.

Each of the connecting members 40 has a main portion 41 of which bottom portion extends erectly downward to form a contact portion 42. A projection 43 protrudes outward at a bottom end of the contact portion 42. A top portion of the main portion 41 defines a locating slot 44 thereon. A side of the main portion 41 is rolled around to form a hollow retaining portion 45.

The plug module 50 includes two plug pins 54 and a linking portion 53 integrating the two plug pins 54 together. The two plug pins 54 keep a distance from each other. Each of the plug pins 54 defines a top end thereof as a plug end 51 and a bottom end thereof as an inserting end 52. The plug end 51 and the inserting end 52 are disposed at the opposite sides of the linking portion 53.

Figure 4:
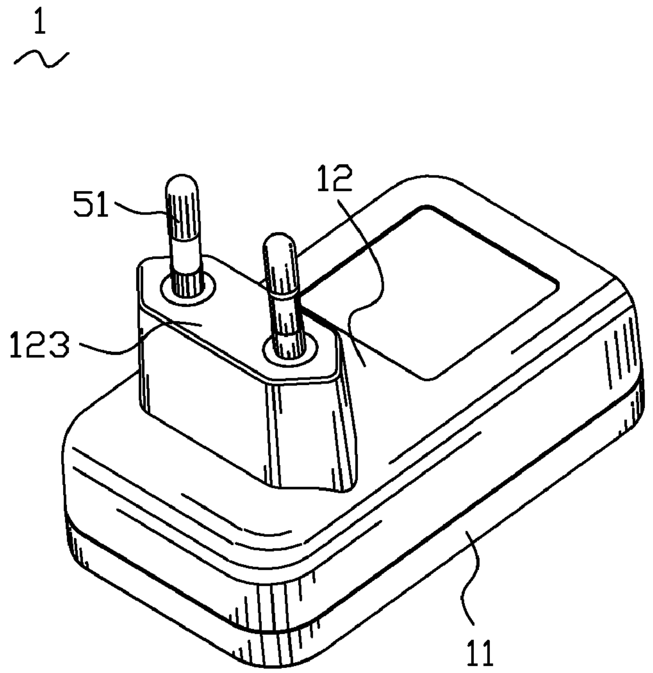
FIG. 4 is a perspective view of the power adapter shown in FIG. 1.
Figure 5:
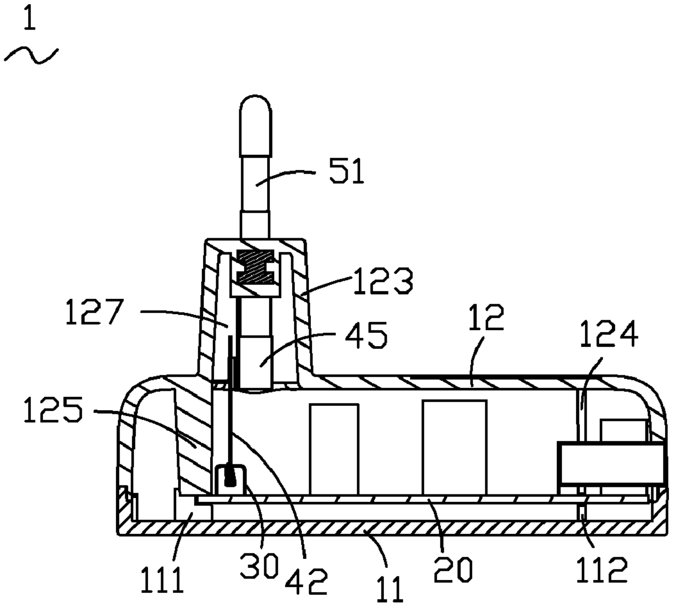
FIG. 5 is a cross-sectional view of the power adapter shown in FIG. 4.

Please refer to FIG. 1, FIG. 4 and FIG. 5. In assembly, the plug module 50 is assembled in the second insulation casing 12. The plug ends 51 protrude out of the convex portion 123 for connecting with an external power device. The inserting ends 52 are received in the notch 126 (as shown in FIG. 2). Then the inserting ends 52 are inserted into the retaining portions 45 of the connecting members 40 for realizing electrical connection therebetween. The fixed boards 127 of the second insulation casing 12 are jammed into the locating slots 44 for locating the connecting members 40. Moreover, the PCB 20 is disposed in the first insulation casing 11. The first holders 111 support the PCB 20 and the first ribs 112 are squeezed in the channels 21. The conductive members 30 are located on the PCB 20. The fixed portions 34 are respectively fixed in the fixing holes 22. Then the contact portions 42 of the connecting members 40 are respectively inserted into the receiving spaces 33 of the conductive members 30 for attaining electrical connection between the connecting members 40 and the conductive members 30. Meanwhile, the second insulating casing 12 is coupled with the first insulation casing 11. The second ribs 124 are squeezed in the channels 21 and the second holder 125 resists against the PCB 20.

Figure 6:
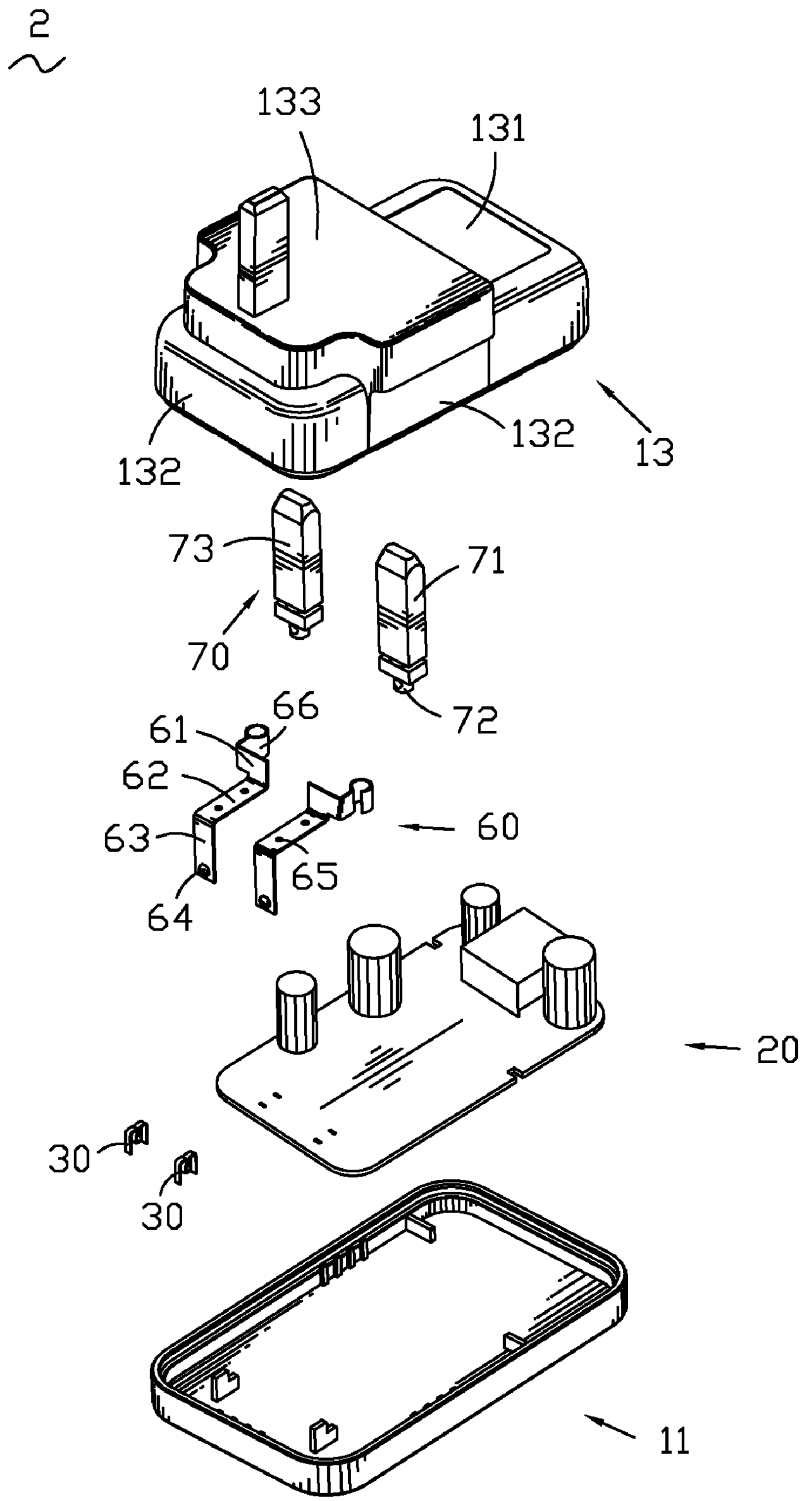
FIG. 6 is an exploded view of a power adapter of a second embodiment of the present invention.
Figure 7:
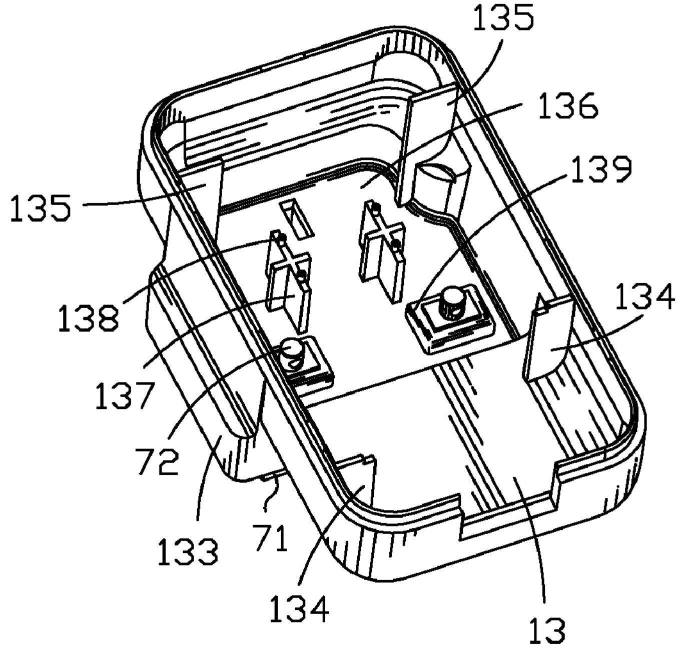
FIG. 7 is an assembly view of a second insulation casing and a plug module of the power adapter shown in FIG. 6.
Figure 8:
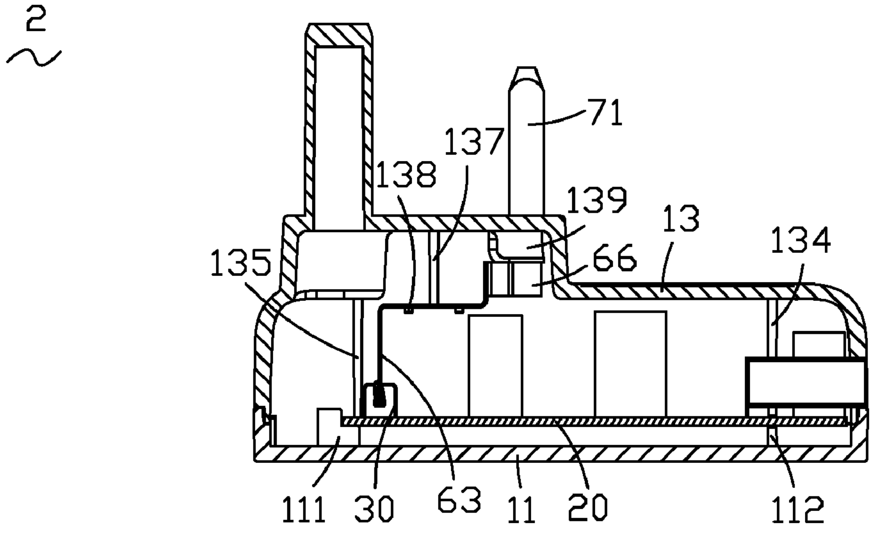
FIG. 8 is a cross-sectional view of the power adapter.

Referring to FIG. 6 to FIG. 8 showing a second preferred embodiment of a power adapter 2 in accordance with the present invention, the power adapter 2 includes a first insulation casing 11, a PCB 20 and a pair of conductive members 30, all of which are the same as that of the power adapter 1 of the first embodiment and not described in detail herein. The power adapter 2 further includes a second insulation casing 13, a pair of connecting members 60 and a plug module 70.

Referring to FIG. 6 and FIG. 7, like the second insulation casing 12 of the power adapter 1, the second insulation casing 13 of the power adapter 2 has a top wall 131, sidewalls 132, a convex portion 133, two second ribs 134, two second holders 135 and a notch 136. Two cross-shaped supporting portions 137 and two quadrate protruding portions 139 respectively protrude abreast upward from a bottom surface of the notch 136. The protruding portions 139 are adjacent to and behind the supporting portions 137 correspondingly. Each of the supporting portions 137 defines two location pegs 138 arrayed in a line on a top surface thereof.

Each of the connecting members 60 has a main portion 61 disposed erectly. A bottom portion of the main portion 61 extends horizontally to form a fixing portion 62 defining two fixing apertures 65 thereon. A free end of the fixing portion 62 extends downward to define a contact portion 63. A projection 64 protrudes outward at a bottom end of the contact portion 63. A side of the main portion 61 perpendicularly extends and then is rolled around to form a hollow retaining portion 66.

The plug module 70 includes two plug pins 73 each of which defines a top end thereof as a plug end 71 and a bottom end thereof as an inserting end 72.

Please refer to FIG. 6 to FIG. 8 again. The assembly process of the power adapter 2 is similar to the power adapter 1. The plug pins 73 of the plug module 70 are disposed in the second insulation portion 13. The plug ends 71 protrude out of the convex portion 133 and the inserting ends 72 protrude out of the protruding portions 139 in the notch 136. Then the inserting ends 72 of the plug module 70 are respectively jammed into the retaining portions 66 of the connecting members 60 for electrical connection therebetween. The location pegs 138 of the second insulation casing 13 are inserted in the fixing apertures 65 of the connecting members 60 for locating the connecting members 60. The contact portions 63 are electrically connected with the conductive members 30 located on the PCB 20. The PCB 20 is located in the first insulation casing 11 coupled with the second insulation casing 13.

As described above, by inserting the contact portions 42, 63 of the connecting members 40, 60 into the receiving spaces 33 of the conductive members 30 which are located on the PCB 20, and by inserting the inserting ends 52, 72 of the plug module 50, 70 into the retaining portions 45, 66 of the connecting members 40, 60, the plug module 50, 70 will be stably connected to the PCB 20. Thus, it will simplify the structure of the power adapter 1, 2 and improve the stability and reliability of the power adapter 1, 2.

What is claimed is:

1. A power adapter, comprising:

an insulation casing;

a printed circuit board received in the insulation casing;

at least one conductive member having at least one fixed portion located on the printed circuit board and defining a receiving space;

a plug module having at least one plug pin of which defining a plug end protruding out of the insulation casing, and an inserting end opposite to the plug end received in the insulation casing; and at least one connecting member received in the insulation casing, the connecting member having a contact portion received in the receiving space of the conductive member for electrical connection therebetween and a retaining portion connecting with the inserting end of the plug module;

wherein the connecting member has a main portion of which one end extends downward to form the contact portion, a side of the main portion is rolled around to form the hollow retaining portion receiving the inserting end of the plug module therein.

2. The power adapter as claimed in claim 1, wherein the conductive member is substantially m-shaped and has a base portion, two ends of the base portion are bent downwardly to form said fixed portions, a substantially middle portion of the base portion sinks towards the same side as the fixed portions to form the receiving space.

3. The power adapter as claimed in claim 2, wherein an opening portion of the receiving space of the conductive member is narrower than a bottom portion thereof.

4. The power adapter as claimed in claim 1, wherein the contact portion of the connecting member defines a projection protruding outward, the projection is received in the receiving space of the conductive member.

5. The power adapter as claimed in claim 1, wherein the main portion of the connecting member defines a location slot at a top portion thereof, the insulation casing defines at least one fixed board therein, the fixed board is jammed into the location slot.

6. A power adapter, comprising:

an insulation casing;

a printed circuit board received in the insulation casing;

at least one conductive member having at least one fixed portion located on the printed circuit board and defining a receiving space;

a plug module having at least one plug pin of which defining a plug end protruding out of the insulation casing, and an inserting end opposite to the plug end received in the insulation casing; and at least one connecting member received in the insulation casing, the connecting member having a contact portion received in the receiving space of the conductive member for electrical connection therebetween and a retaining portion connecting with the inserting end of the plug module;

wherein the connecting member has a main portion, a fixing portion extends sideward from an end of the main portion, a free end of the fixing portion extends downward to form the contact portion, a side of the main portion is rolled around to form the hollow retaining portion receiving the inserting end of the plug module therein.

7. The power adapter as claimed in claim 6, wherein the fixing portion of the connecting member defines at least one fixing aperture, the insulation casing defines at least one supporting portion inside, the supporting portion defines at least one location peg received in the fixing aperture.

* * * * *